(12) United States Patent
Tolstedt et al.

(10) Patent No.: US 9,043,951 B2
(45) Date of Patent: Jun. 2, 2015

(54) SYSTEM AND METHOD FOR CREATING AGRICULTURAL TRAMLINES

(71) Applicants: Jonathan L. Tolstedt, Fargo, ND (US); Christopher L. Giese, Fargo, ND (US)

(72) Inventors: Jonathan L. Tolstedt, Fargo, ND (US); Christopher L. Giese, Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 75 days.

(21) Appl. No.: 13/945,467

(22) Filed: Jul. 18, 2013

(65) Prior Publication Data

US 2015/0025752 A1    Jan. 22, 2015

(51) Int. Cl.
| | |
|---|---|
| A01C 15/00 | (2006.01) |
| A01B 79/00 | (2006.01) |
| A01C 21/00 | (2006.01) |
| G05D 1/02 | (2006.01) |
| G06F 19/00 | (2011.01) |

(52) U.S. Cl.
CPC .............. *A01C 21/005* (2013.01); *G05D 1/021* (2013.01); *G05D 1/0278* (2013.01); *G05D 2201/0201* (2013.01)

(58) Field of Classification Search
CPC .......... A01C 15/00; A01C 7/087; G06F 7/70; G06F 19/00; A01B 79/005; A01B 79/00; G01C 21/26
USPC ............ 701/50, 408, 410, 468, 532; 111/200
See application file for complete search history.

(56) References Cited

U.S. PATENT DOCUMENTS

| | | | | |
|---|---|---|---|---|
| 5,931,882 | A * | 8/1999 | Fick et al. ...................... | 701/50 |
| 5,991,694 | A * | 11/1999 | Gudat et al. ...................... | 702/2 |
| 7,591,226 | B2 * | 9/2009 | Dix et al. ...................... | 111/200 |
| 8,571,764 | B2 * | 10/2013 | Peterson et al. ................ | 701/50 |
| 2004/0193348 | A1 * | 9/2004 | Gray et al. ...................... | 701/50 |
| 2009/0099737 | A1 * | 4/2009 | Wendte et al. .................. | 701/50 |
| 2011/0270495 | A1 * | 11/2011 | Knapp ............................ | 701/50 |

* cited by examiner

*Primary Examiner* — Tan Q Nguyen
(74) *Attorney, Agent, or Firm* — Jonathan L. Tolstedt; Mark E. Brown

(57) ABSTRACT

A system for creating an agricultural tramline, comprising an agricultural planter, an application executing on a computer terminal, one or more seeding units mounted on the planter, a location sensor, and a planter control system, whereby an operator can use the application to create a file specifying the location of a desired agricultural tramline on a plot of land, which is downloaded from the computer terminal to the planter control system, and where the planter control system uses the location of the desired agricultural tramline and location information from the location sensor to enable and disable the plurality of seeding units, such that the area of land corresponding to the desired agricultural tramline is not planted with seed.

12 Claims, 9 Drawing Sheets

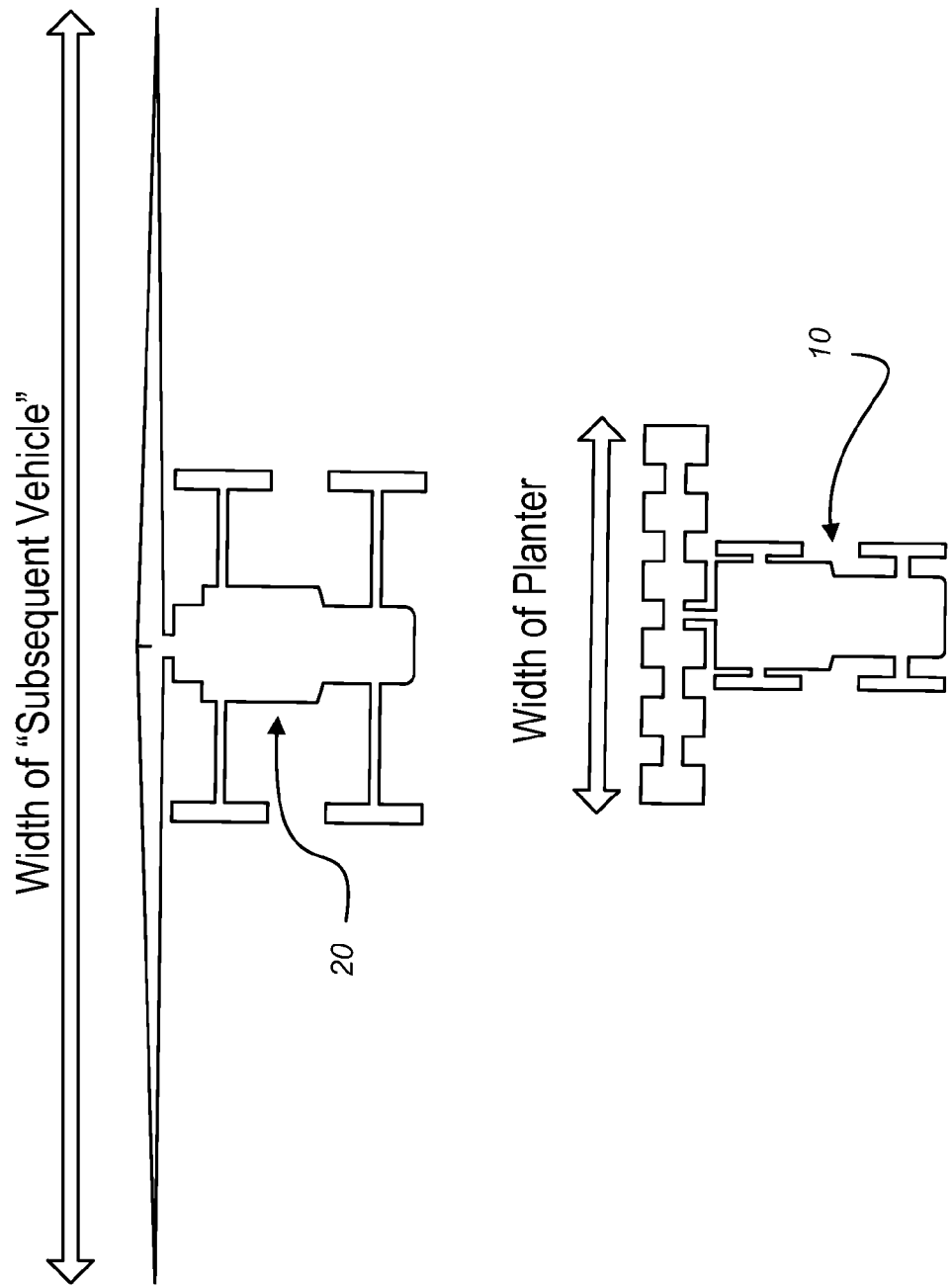

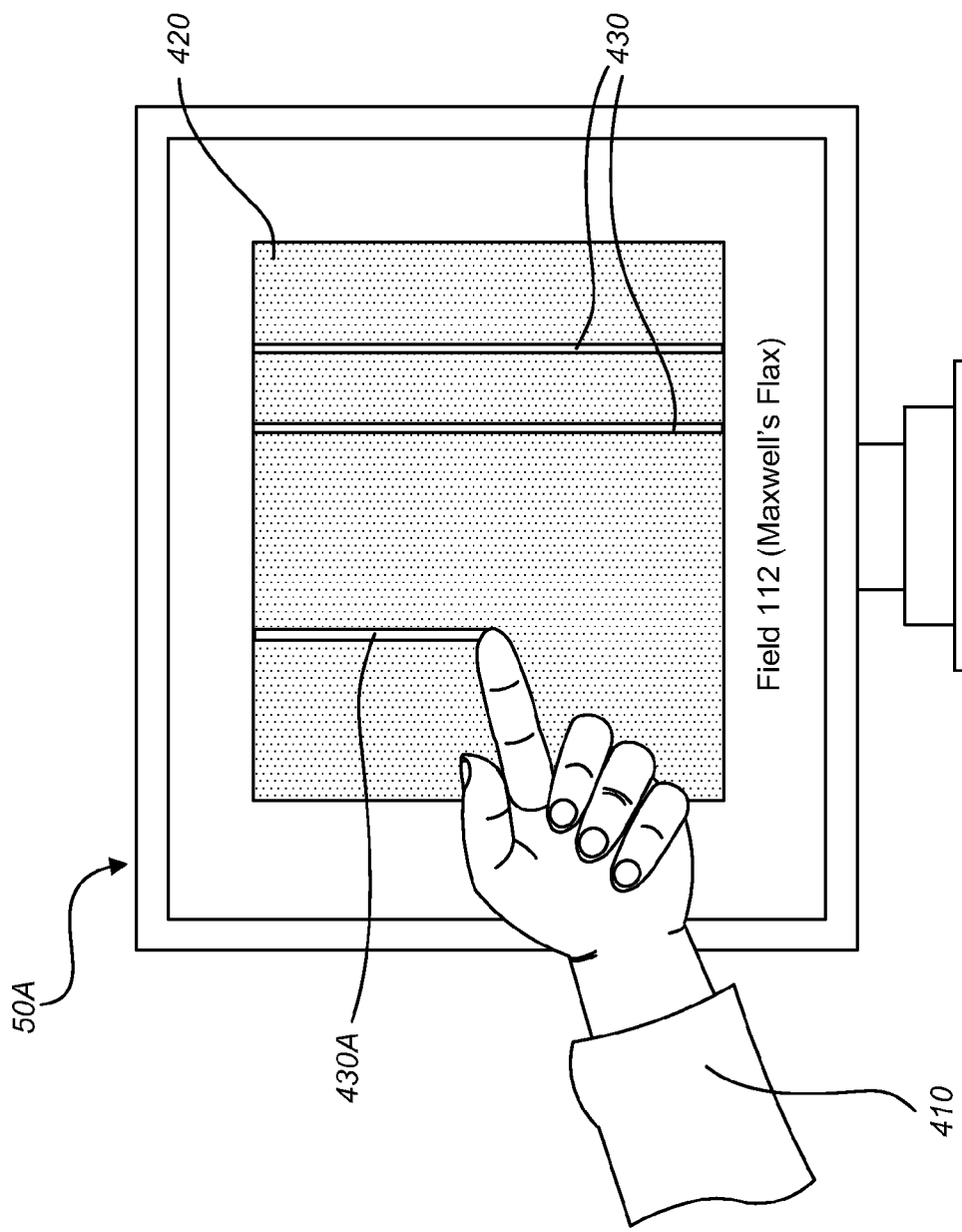

SYSTEM AND METHOD FOR CREATING AGRICULTURAL TRAMLINES

CROSS REFERENCE TO RELATED APPLICATIONS

Not applicable.

FIELD OF INVENTION

This invention relates to the field of precision agriculture, and specifically to a system and method for the generation of tramlines in an agricultural field.

BACKGROUND

Tramlines are open tracks that are purposefully left unseeded in a field by a planter so that vehicles performing subsequent operations (such as chemical application) can use the tramlines as a path through the field, thereby avoiding damage to existing plants. Since vehicles used for seeding a field (such as a planter, seeder, or drill) and for these subsequent operations (such as a sprayer) are usually significantly different widths (for example, the width of a sprayer may be multiple times the width of a seeder for the same field), calculations must be performed before or during the planting operation to determine when seeding units on the planter should be turned off or disabled, so that seed is not put down in the locations where the tramlines will be.

Please note that the terms "planter" and "seeder" may be used interchangeably throughout the specification. In practice, a planter and a seeder are sometimes seen as distinctly separate vehicles or implements, albeit with a similar purpose, with the planter used for row crops with larger spacing between rows (such as corn) and the seeder being used for crops with a smaller spacing between rows (such as wheat). However, it is difficult to find a standard definition for these pieces of equipment. For the purposes of discussion within this specification, the terms "planter", "seeder", and "drill" (another term used in industry, typically synonymous with "seeder") shall be assumed to be interchangeable, and each shall refer to an agricultural machine (either a self-propelled vehicle or a tow-behind implement) the purpose of which is to place crop seeds, bulbs, roots, and/or plants into the ground as an agricultural crop. The preferred term used in this specification shall be "planter" and this term will be used for the majority of the references. The term "agricultural planting machine" will be used when a single, generic term is needed for these type of vehicles, such as in the claims for this invention.

It should also be noted that the inventive concept described herein refers to two separate types of agricultural machines that work together to first plant a field and later maintain the field. For the purposes of this discussion, it is assumed that a first agricultural machine (the "planter," as defined in the previous paragraph) will perform an operation which plants a crop in at least a portion of a field, and a second agricultural machine, or "subsequent vehicle," will pass over the same field or portion of a field at a later time, after the crop has been planted. The "subsequent vehicle" may be a chemical sprayer, a fertilizer spreader, an implement pulled by a tractor, or any other appropriate type of vehicle which may need to pass over a previously planted portion of a field. Since a sprayer is a common type of "subsequent vehicle," a sprayer is often used as an example within this specification. However, the use of a sprayer in the figures or corresponding discussion is as example only, and any other appropriate type of "subsequent vehicle" may be used without deviating from the invention concept presented herein.

To create the tramlines using systems available in the prior art, a planter typically needs to know the boom width, wheelbase, and tire width of the subsequent vehicle (such as the sprayer). This is because there are a line of seeding units mounted in a line on the back of the planter, each seeding unit corresponding to a planted row in the field. If the operator of the planter can control (enable and disable) the individual seeding units on the back of the planter, then individual rows can be disabled in the locations where it is desired to have a tramline. If the planter and the sprayer were identical widths, then the tramline solution could be designed into the planter itself (by simply not having seeding units in the locations where tramlines will be, so that these rows are never planted. However, it is not practical to have an implement with a large number of individual seeding units (whereas extending a long spray boom, which does not engage the ground, is relatively easy and desirable). Therefore, the width of the sprayer is typically some multiple of the width of the planter. The number and side-to-side location of seeding units that need to be turned off for a given pass of the planter will vary from one pass through the field to the next.

Planting systems in the prior art are capable of automatically calculating which seeding units should be turned off for a given pass. U.S. Pat. No. 7,591,226 by Dix et al. of CNH America (hereafter the "'226 patent") describes a planting system which determines which seeding units to disable based on the width of the sprayer or "subsequent vehicle" (and its wheel base, tire width, etc.) as well as the corresponding width and configuration information for the planter. For instance, if we assume the sprayer is approximately five times the width of the planter, the rough location of the desired tramline (that will work for the sprayer) can be calculated by the ratio and relationship of the widths of the two vehicles. That is, it is possible to calculate which rows (which seeding units) should be disabled on the planter as it passes through the field by calculating the desired tramline location for the sprayer (or other subsequent vehicle) based on the sprayer's width and configuration. As long as the width of the sprayer is an even multiple of the width of the planter, and the configuration of each machine is known to the planter, this approach works relatively well.

However, this approach has its limitations. The approach described in the '226 patent requires that the configuration of the subsequent vehicle be known to the planter, so that the calculations of which units to turn off can be made as the planter makes passes through the field. If the same planter is used in conjunction with two different kinds of sprayers (with different configurations and widths), such as might be the case with a contract spraying operation open to different farmers, then the planter has to know which field it is on or which sprayer is used in that field.

What is needed in the art is a system and method for generating agricultural tramlines which does not rely on knowing the physical size and configuration of a subsequent vehicle.

SUMMARY OF THE INVENTION

According to one aspect of the present invention, a system for creating an agricultural tramline, comprising an agricultural planter, an application executing on a computer terminal, one or more seeding units mounted on the planter, a location sensor, and a planter control system, whereby an operator can use the application to create a file specifying the location of a desired agricultural tramline on a plot of land, which is downloaded from the computer terminal to the planter control system, and where the planter control system uses the location of the desired agricultural tramline and location information from the location sensor to enable and disable the seeding units as needed, such that the area of land corresponding to the desired agricultural tramline is not planted with seed.

According to another aspect of the present invention, a system for creating an agricultural tramline, comprising an agricultural planter, an application executing on a computer terminal, one or more seeding units mounted on the planter, and a planter control system, whereby an operator can use the application to create a file specifying the location of a desired agricultural tramline on a plot of land, relative to one or more boundaries of the plot of land, which is downloaded from the computer terminal to the planter control system, and where the planter control system uses the location of the desired agricultural tramline and the planter's relative position in the field to enable and disable the seeding units as needed, such that the area of land corresponding to the desired agricultural tramline is not planted with seed.

According to yet another aspect of the present invention, a method for creating an agricultural tramline, comprising the steps of creating a file defining the desired location of one or more agricultural tramlines within a plot of land, equipping an agricultural planter with a control system that can enable and disable the planting function of each of a series of individual seeding units mounted on the planter, equipping the planter with a location sensor, transferring the tramline definition file to the control system, commanding the control system to obtain the current location of the agricultural planting machine, commanding the control system to calculate the locations of each of the series of individual seeding units based on the current location of the agricultural planting machine, commanding the control system to compare the locations of each of the series of individual seeding units to the desired location of the one or more agricultural tramlines defined by the file, and commanding the control system to disable any individual seeding unit that is coincident with the desired location of the one or more agricultural tramlines, and enable the remaining individual seeding units, whereby an area in the plot of land that is coincident with the desired location of one or more of the agricultural tramlines is not seeded, while the remaining area of the plot of land is seeded, such that an agricultural tramline is created.

This aspect and others are achieved by the present invention, which is described in detail in the following specification and accompanying drawings which form a part hereof.

BRIEF DESCRIPTION OF DRAWINGS

FIG. 1A is a graphic illustrating the potential difference in dimension (specifically width) between a planter and a "subsequent vehicle."

FIG. 6A is an illustration of how an operator can use a desktop computer or vehicle-mounted display to define the desired locations for tramlines in a field.

DETAILED DESCRIPTION OF THE PREFERRED EMBODIMENT

Figure 1B:
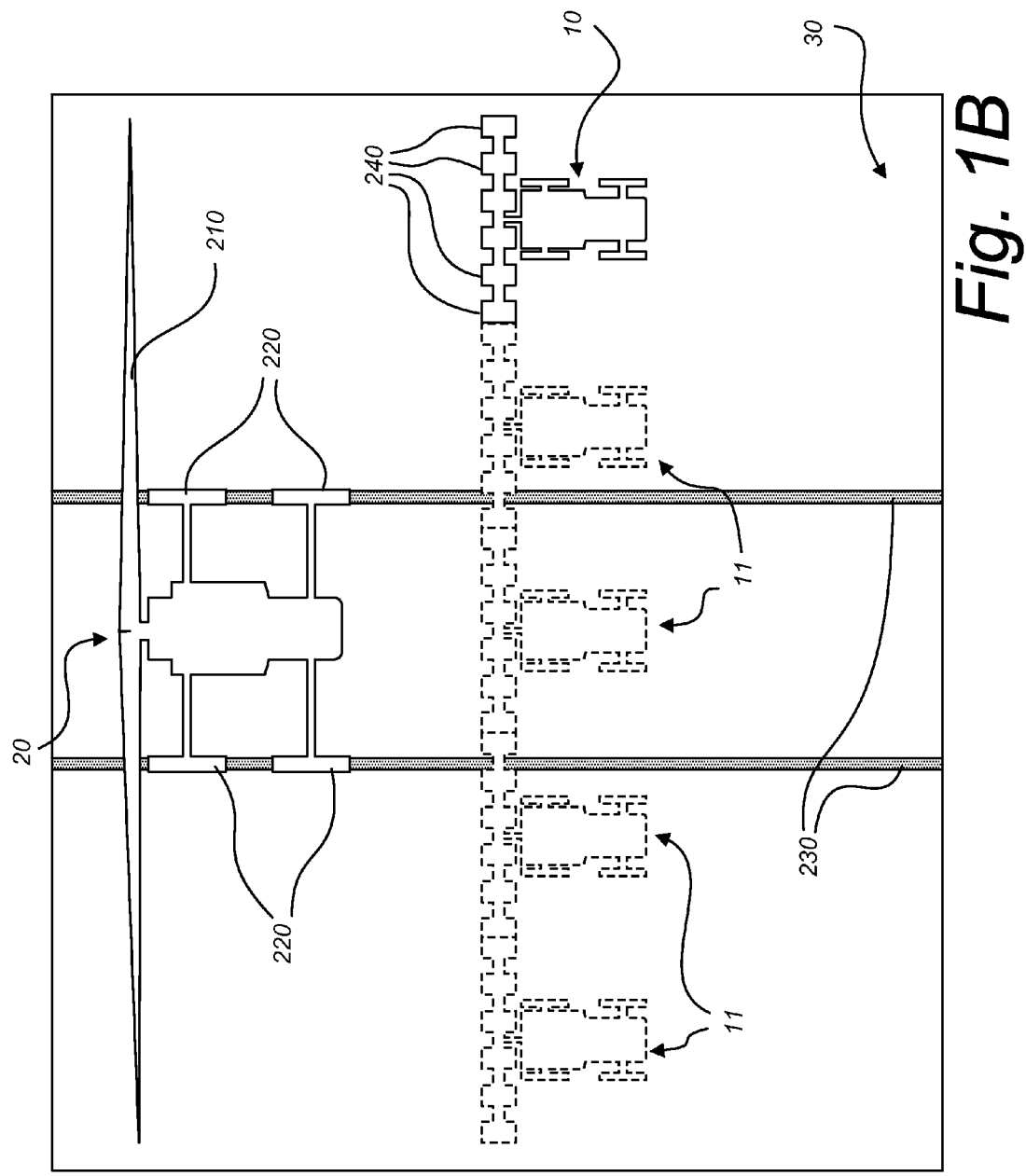
FIG. 1B is a graphic further illustrating the potential difference in dimension (specifically width) between a planter and a "subsequent vehicle," and introducing the concept of tramlines.

With reference now to the drawings, and in particular to FIGS. 1A through 6 thereof, a new system and method for creating agricultural tramlines will be described.

The present invention improves upon the prior art by removing the requirement that a planter know the configuration and dimensions of a "subsequent vehicle" (as defined previously in this specification) by introducing the concept of "virtual tramlines." For the purposes of this discussion, the term "virtual tramline" will refer to the necessary location data (potentially endpoint data, such as X-Y coordinates or latitude-longitude pairs) needed to define an agricultural tramline. An agricultural tramline, or simply "tramline" for the purposes of this specification, is a permanent wheel track created in a field that remains unplanted, and which provides a path for a vehicle (such as a sprayer, fertilizer spreader, etc.) to pass over a seeded or planted plot of land without damaging the crop or compacting the planted soil. Ideally, when a planter moves through a field, it will know which areas to leave unplanted without human intervention, so that these wheel paths (tramlines) are automatically created or maintained during normal planting operations.

In the approach taken by the present invention, instead of needing to know the width of a particular subsequent vehicle (as previously defined) to calculate tramline locations as it plants a field, the planter is given data defining the desired location and dimensions of the tramlines, relative to the field in which they will be created, directly. The size and location of each tramline is calculated before the planting operation begins (not during the planting operation), and this data can be calculated by any appropriate method.

For instance, in one embodiment, the user (farmer/operator) may use an app executed on a tractor-mounted display, a personal computer, or a mobile device (iPad, cellphone, notebook computer, etc.) to draw tramlines on a graphic representing the size and dimensions of the field. The application itself may rely on the configuration of the sprayer to make suggested tramline locations, or the operator can just enter known tramline location data based on previous years of operation.

Once these "virtual tramlines" are generated using the application, the data defining the location, shape, and dimensions of the desired tramlines is downloaded or transmitted to a controller on the planter, which uses the information to determine which seeding units to turn off and for how long.

The above embodiment will now be described in additional detail in a discussion of FIGS. 1A through 6.

FIG. 1A illustrates the potential difference in width between a planter 10 and a "subsequent vehicle" 20 as previously defined in this specification. For the examples presented herein, an agricultural sprayer will be used when a specific example of a subsequent vehicle 20 is needed, but any appropriate type of vehicle that is required to drive over a planted field may be substituted as the subsequent vehicle 20.

In the example shown in FIG. 1A, there is a significant difference between the planter 10 and the subsequent vehicle 20. As shown, the subsequent vehicle 20 is approximately five times the width of the planter, but this specific width difference is for example only, to illustrate that the width of a subsequent vehicle 20 can be a multiple of the width of the planter 10.

The difference in the widths of these vehicles is often due to practical reasons. Turning now to FIG. 1B, we see that the width of the subsequent vehicle 20 is due to the length of the boom 210 extending from the back of the subsequent vehicle 20. The boom 210 is a long spar or strut typically extending out in both directions from the back of a vehicle such as a chemical sprayer, and it is used to support the hoses carrying the chemical to be sprayed, and to suspend spray nozzles above the crop.

Ideally, the length of the boom 210 is made as long as possible, such that the area of the field that can be covered by the subsequent vehicle 20 for a single pass through the field 30 can be maximized. That is, a boom 210 that is 100 feet wide is able to cover the area of a field in half as many passes as a boom 210 that is 50 feet wide. The longer the boom 210, the less time it takes to apply chemical to the field 30.

The same principle applies to a planter 10. It would be ideal to maximize the width of the planter 10 to cover as many rows of a field 30 as possible. It would also be ideal to make a planter 10 that is the same width as the subsequent vehicle 20, to avoid the problem all together (and eliminate the need to handle tramlines in a special manner).

However, the seeding units 240 on the back of a planter 10 are heavy and bulky, and the seeding units 240 are ground-engaging. That is, in order to plant a seed at an appropriate depth in the soil, some part of the seeding unit 240 must dig into the soil and overturn it such that a seed can be placed beneath the surface. It is not practical, therefore, to make a planter 10 which covers the same width as a subsequent vehicle, as the forces required to drag the seeding units 240 through the soil for any period of time would be large, and would bend or destroy such a boom.

The boom 210 on a subsequent vehicle 20, however, does not support any ground-engaging elements, and the hoses and nozzles of a vehicle such as an agricultural sprayer are light in comparison with the seeding units 240 of a planter 10. Therefore, the width of the subsequent vehicle 20 is often many multiples wider than the width of the planter 10.

In FIG. 1B, several dotted line representations of a planter 11 are shown next to the actual planter 10 to illustrate the difference in width relative to a subsequent vehicle 20. In this specific example, the planter 10 and the dotted line planters 11 show that the subsequent vehicle 20 is five times as wide as the planter 10. The dotted line planters 11 also show that multiple passes of the planter 10 have to be made for every one pass of the subsequent vehicle 20, and that the planter 10 would move over the tramlines 230 on some of its passes through the field, but not all of them. The width of the tramlines 230 in a typical field 30 are based on the width of the wheelbase (the distance between tires 220 on opposing sides of the subsequent vehicle 20) and the width of the individual tires 220 of the subsequent vehicle 20, and not on the dimensions of the planter 10. The planter 10 somehow needs to know where the tramlines 230 need to be, and not plant seed it those tramlines 230. In prior art systems, this required that the planter 10 know the width of the subsequent vehicle 20. This is a significant limitation of the prior art, one which the present invention is able to eliminate.

Figure 2:
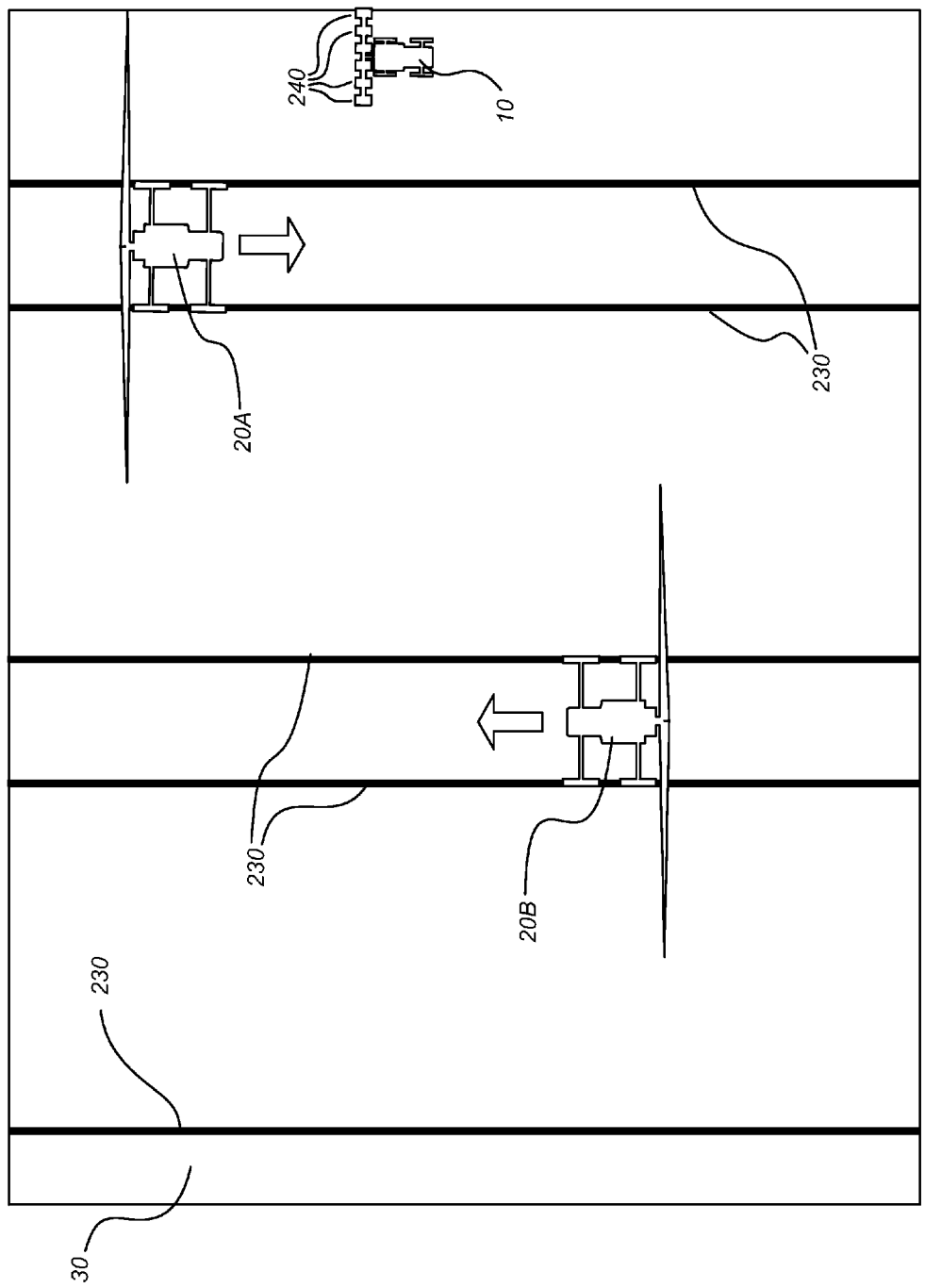
FIG. 2 provides an illustration and definition of agricultural tramlines as they relate to a planting operation.

FIG. 2 better illustrates these concepts by showing a larger portion of the field 30 showing multiple sets of tramlines 230, as well as a subsequent vehicle in two different positions in the field (20A and 20B), moving in opposite directions and on different passes. If we assume that a planting or spraying operation as shown in FIG. 2 starts on the right-hand side of the figure, it can be seen that the sprayer in position 20A is making its first pass through the field (traveling toward the bottom of FIG. 2), and that the sprayer in position 20B is on its second pass, traveling in the opposite direction. The planter 10, however, (shown here for representational purposes, and likely not on the field 30 at the same time as the subsequent vehicle 20A/20B), is on its first pass through the field. In its current position on the first pass, the planter 10 is not currently passing over a tramline 230, and so no seeding units 240 need to be shut off. All rows can be planted. This will likely change when the planter 10 turns around and starts pass 2 through field 30. In this case, it is likely that one or more of the seeding units 240 will be coincident with one of the tramlines 230, and will need to be disabled (temporarily shut off so no planting occurs where a tramline 230 is supposed to be).

Figure 3:
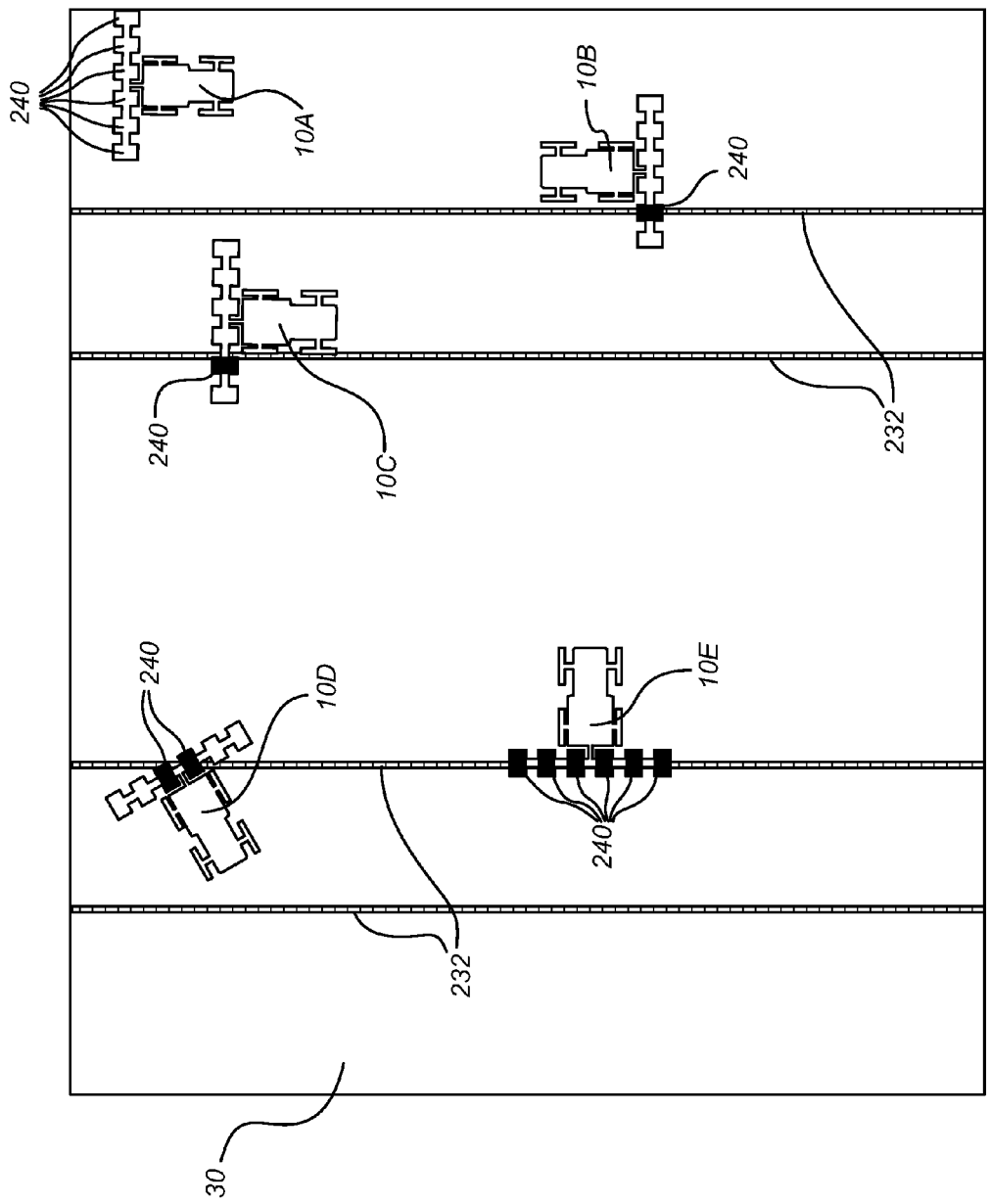
FIG. 3 is a graphic illustrating how the individual seeding units on a planter are turned off when they are known to be coincident with a desired tramline location.

Turning now to FIG. 3, we see a representation of field 30 with a planter in various positions in the field (10A, 10B, 10C, 10D, and 10E). Each of the different planter positions is shown in a different location relative to the anticipated locations of future tramlines (or "virtual tramlines") 232. It should be noted that the virtual tramlines in FIG. 3 are identified with reference designator 232, while the actual tramlines in FIGS. 1A, 1B, and 2 are identified with reference designator 230. The distinction between a virtual tramline 232 and an actual tramline 230 is that the virtual tramlines do not exist yet, but represent the intended locations of future actual tramline 230. A virtual tramline 232 may be defined by endpoint data, such as a pair of latitude-longitude coordinates representing the two ends of the tramline. The definition of the virtual tramline 232 may also need to contain the width of the tramline, which might be done by specifying a separate number representing desired tramline width, or by specifying four total endpoints (representing the four corners of a rectangle), or by any other appropriate method. When the actual tramlines 230 are created, they will ideally be located in the exact place and position as defined by the virtual tramline 232.

When the planter is in position 10A in FIG. 3, none of the seeding units 240 is coincident with one of the virtual tramlines 232, so none of them are turned off. When the planter is in position 10B, one of the seeding units 240 (indicated by the black rectangle on the seeding unit shown over the virtual tramline 232) should be turned off, so that seeds will not be planted in the location where the actual tramline 230 will be. The planter in position 10C also had one of its seeding units 240 turned off, but it is a different seeding unit 240 than the seeding unit 240 turned off in position 10B, because the planter 10C is moving in an opposite direction of planter 10B.

It may be possible that a planter needs to move across a virtual tramline 232 at an angle, perhaps when working around an obstacle or when planting an irregularly shaped field (such as a field with a rounded or curved corner or edge). In these cases, multiple seeding units 240 may need to be turned off, depending on the angle of the planter to the virtual tramline 232.

For example, the planter at position 10D is moving across a virtual tramline 232 at approximately a 45-degree angle. As planter 10D moves across the virtual tramline 232, each of the seeding units 240 will be turned off and back on as it becomes coincident with the virtual tramline 232. In the current position for planter 10D, the two middle seeding units 240, are turned off (as shown by the black rectangles), since they are currently coincident with the virtual tramline 232.

The planter in position 10E is shown moving perpendicular to the length of virtual tramline 232, such that all of the seeding units 240 are seen as coincident with the virtual tramline 232 at the same time. Therefore, as shown by the black rectangles on planter 10E, all seeding units 240 will be turned off as the planter 10E moves over the virtual tramline 232. Once planter 10E moves forward, all of the seeding units 240 will be pulled off of the position with the virtual tramline 232, and so all seeding units 240 will be turned back on simultaneously.

In order for the system of the present invention to know when one or more of its seeding units 240 are coincident with a virtual tramline 232, so that it can disable and enable the seeding units 240 as needed, the planter 10 must know its current location very accurately, and it must know the geospatial location of each of its separate seeding units 240 separately.

This approach requires that the planter have an accurate source of location data, such as a global navigation satellite system (GNSS) receiver (such as the global positioning system, or GPS) enhanced with RTK (Real Time Kinematic) data, or augmented with a system such as a wide-area augmentation system (WAAS), such that the location information generated by the planter unit ideally has centimeter-accurate location information. Although the requirement for highly-accurate location is a limitation of this approach, this level of accuracy is becoming more and more common for these types of agricultural applications, and the present invention can be offered as an option when that accuracy is present.

Figure 4:
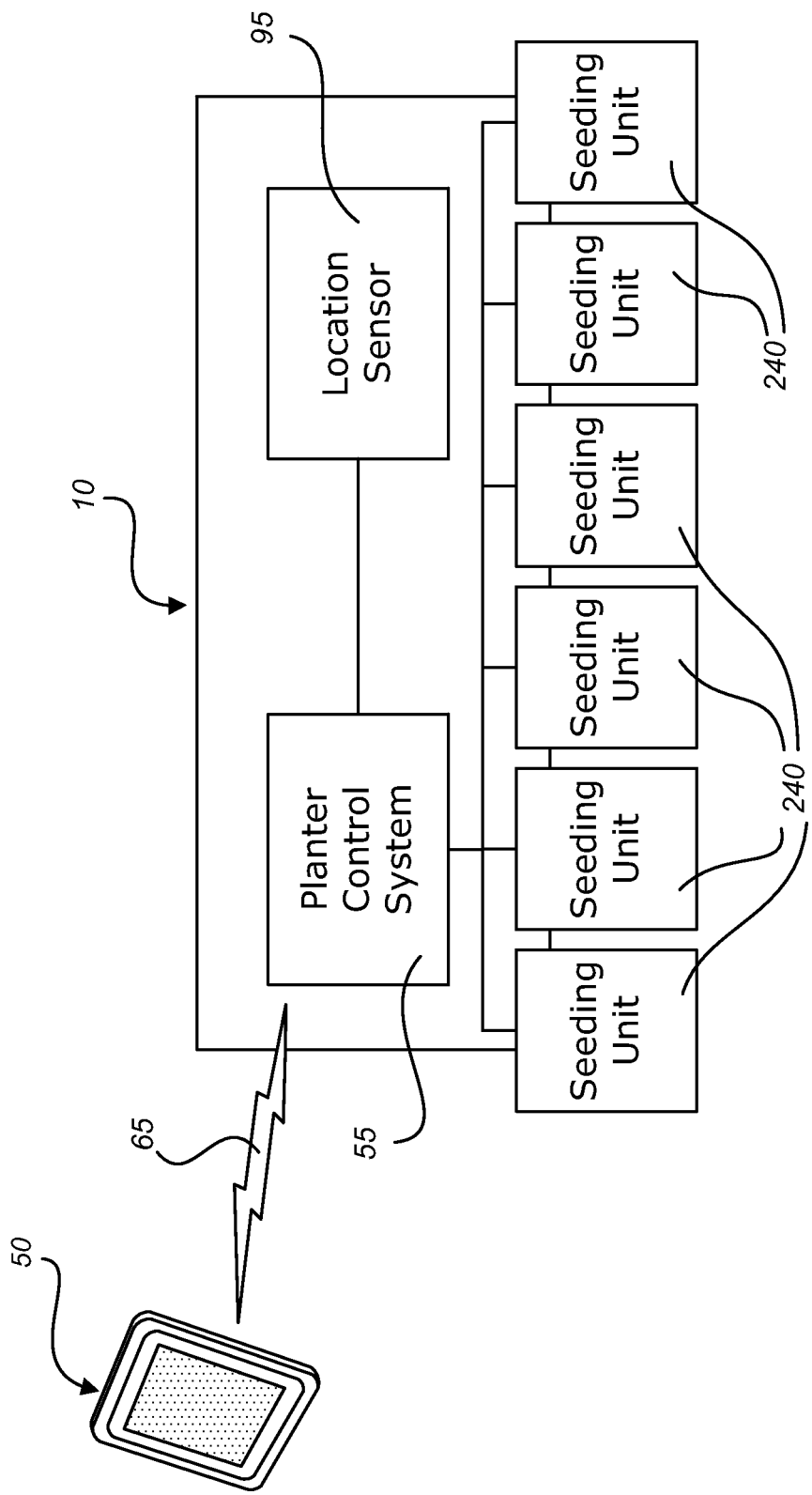
FIG. 4 is a block diagram detailing one embodiment of the system for creating agricultural tramlines of the present invention.

FIG. 4 is a block diagram of one embodiment of the system for creating agricultural tramlines of the present invention. The operator of the system will use a computer terminal 50 to create or enter the virtual tramline data. The computer terminal 50 may be a desktop computer, a laptop computer, a mobile device (such as an iPad or smart phone), a vehicle-mounted display, or any other appropriate type of computing platform. The computer terminal 50 may be connected to the vehicle systems, including data communications busses or power busses, or it may be a separate stand-alone device.

Once the operator creates the virtual tramline data on the computer terminal 50, the virtual tramline data is downloaded or transmitted to the planter control system 55 on the planter 10 via an information pathway 65. The information pathway 65 may be a wireless connection, a wired connection, or any other appropriate means for transmitting information from the computer terminal 50 to the planter control system 55.

The virtual tramline data received by the planter control system 55 comprises location information defining the desired location of one or more tramlines for a specific area of land, such as a field. This data may be a set of endpoints defining one or more line segments, rectangles, or other geometric shapes which are representation of the desired tramlines. Alternately, this data may be a combination of endpoints, offsets, and other data defining the characteristics of the desired tramlines (such as desired tramline width). Endpoints, if used, may consist of pairs of latitude-longitude coordinates, X-Y offsets from a designated "origin" point in the target field, or any other appropriate way of defining specific locations.

The planter control system 55 receives location information from a location sensor 95. This location sensor 95 generates data defining the current location of the planter 10 at a given point in time. The planter control system 55 uses the location information received from the location sensor 95 during the planting operation to determine if any of its seeding units 240 are currently coincident with one or more of the virtual tramlines 232 (which are defined by the virtual tramline data received from the computer terminal 50). If one or more of the seeding units 240 are currently located over part of a virtual tramline 232, the planter control system 55 will command those specific seeding units 240 which are coincident with the virtual tramline 232 to stop planting until they are no longer over the virtual tramline 232. In this method, the actual tramlines 230 are created in the desired location as defined by the virtual tramlines 232.

The location sensor 95 is a sensor capable of determining a highly-accurate geographic location for the planter 10. Although any appropriate type of location sensor may be used without deviating from the intent of the present invention, FIG. 5 and the corresponding discussion below describe the use of a location system based on a global navigation satellite system (GNSS). Additional detail is provided below in the discussion of FIG. 5.

The planter control system 55 comprises one or more electronic control units comprising at least a microprocessor, input/output circuitry, and a communications means for receiving virtual tramline data over pathway 65 and for communicating with the location sensor 95 and the seeding units 240. This type of electronic control system is common in modern vehicles and would be relatively easy to create for one skilled in the art, so no additional detail need be provided on the planter control system 55 to enable this invention.

Because the seeding units 240 are permanent mounted on the planter 10 in a known configuration, the planter control system 55 can calculate the position of each individual seeding unit 240 by knowing the physical offset distance from each seeding unit 240 to the location sensor 95. Each seeding unit 240 is in a different location, and so determining the specific location of each seeding unit 240 is important, such that it can be determined which units, if any, are over the virtual tramline 232 at any given moment.

For the purposes of this specification, a "seeding unit" is defined to be mechanical apparatus or system that is capable of delivering one or more seeds or plants to a location beneath the surface of the soil in an agricultural field or similar plot of land, and which can be controlled either electrically or mechanically (or through a combination of either) so that it can be disabled (prevented from seeding or planting) and enabled (allowed to seed or plant) upon command. One embodiment of a seeding unit 240 is an individual row on an air seeder. Each row on an air seeder has an "opener" and a channel through which seed is blown by forced air from a central point to a point just above the ground. The opener is a device such as a disk or blade which is dragged through the soil to create a trench in the soil into which seeds can be inserted. The channel is typically a hose, the end of which is pointed at the ground, just above the trench that is created by the opener, and through which seeds are blown by forced air into the trench (are planted).

Another embodiment of a seeding unit 240 can be found on a planter, such as a corn planter. Each row on a planter (each seeding unit) comprises a seed box, a seed meter, and an opener. Similar to the air seeder, the planter uses the opener to open a trench in the ground into which seeds can be place. The seed box is a box or tank containing seed to be planted, and the seed is pulled by gravity to the bottom of the seed box where it falls out of a small channel in the bottom of the seed box. The seed meter is a device such as a rotating plate which is placed over the channel at the bottom of the seed box in order to control the rate at which the seed is released. A hole through the plate, located off-center on one half of the circle that defines the area of the plate, is rotated under the seed box and back out again, allowing one seed (or a small number of seeds) to drop through the channel in the bottom of the seed box at a regular rate. The rotation speed of the plate can be controlled electrically or mechanically, such that the rate of seed placement can be controlled, or turned off all together.

These are two examples of seeding units 240 that can be used in the present invention. Other types of seeding units 240 do exist and can be used in the present invention without varying from the inventive concept, and are well known to one skilled in the art. The common characteristics of any seeding unit 240, as used in this specification, are: (1) there is one seeding unit per row of planted field, (2) each seeding unit can be enabled (allowed to seed) and disabled (stopped from seeding), and (3) a seeding unit can be controlled by an electronic control system, such as the planter control system 55 as described herein.

Figure 5:
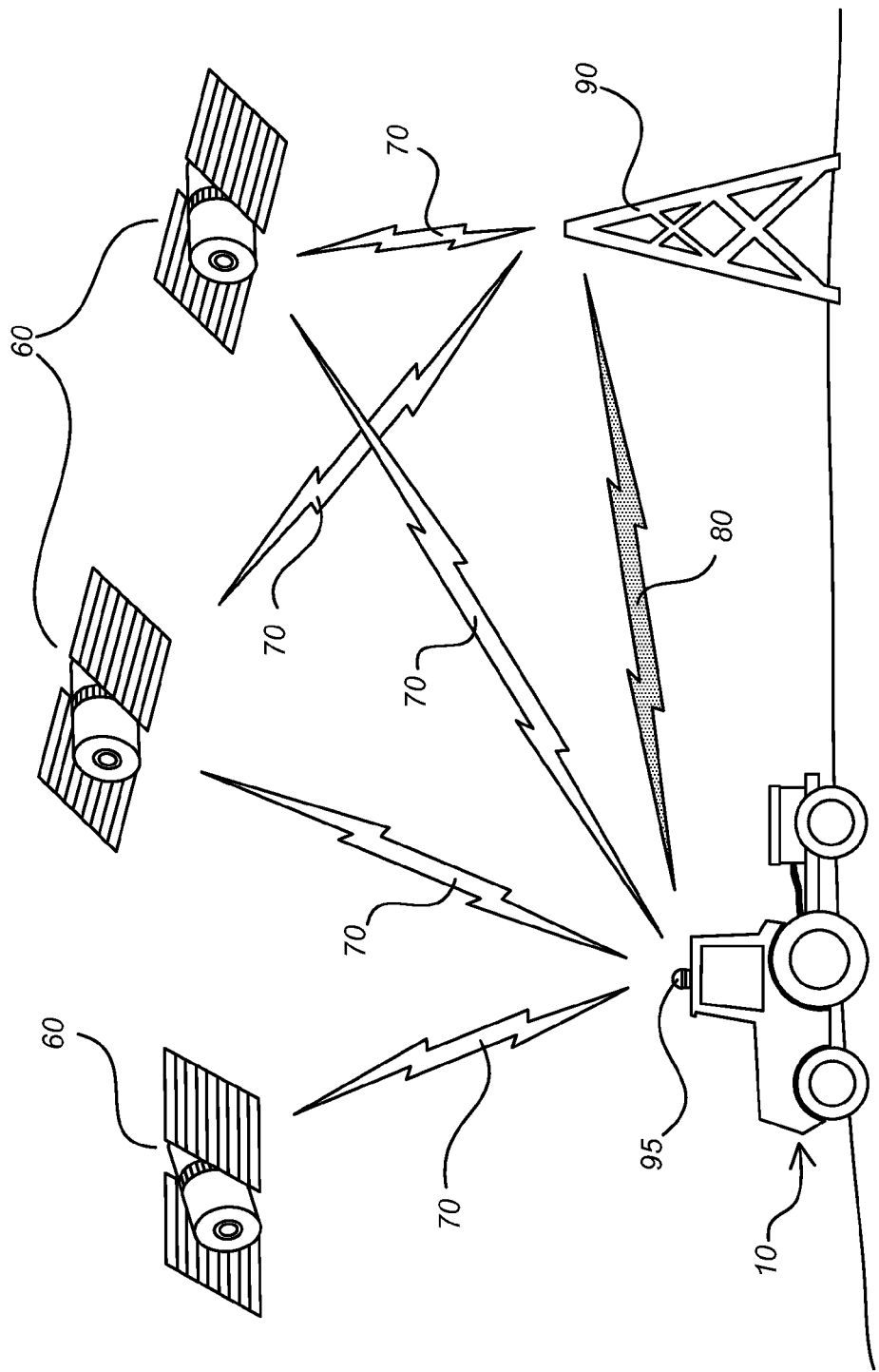
FIG. 5 illustrates how an augmentation system can be deployed to create a more accurate location determination by a global navigation satellite system (GNSS).

FIG. 5 details one embodiment of a GNSS location system with accuracy sufficient to meet the requirements of the present invention. For the purposes of this embodiment, the location sensor 95 from FIG. 4 will be assumed to be a GNSS receiver. However, any appropriate type of location sensor could be used instead of a GNSS receiver.

A series of geo-synchronous satellites 60 form a GNSS, and each satellite 60 continuously transmits information 70 to a location sensor 95 (for example, a GNSS receiver) mounted on or contained within the planter 10. This information 70 typically includes a very accurate timestamp of when the information 70 was transmitted, as determined by the satellite 60, as well as the position of the satellite 60 as the time the message was transmitted.

Once the information 70 is received by the location sensor 95, the location sensor 95 compares the timestamps it receives from multiple satellites 60, and uses the different delays seen in the receipt of the information 70 from different satellites 60 to triangulate a position. For example, if two satellites transmit a signal at exactly 0100 hours Greenwich Mean Time (GMT), and the location sensor 95 receives the signal from the first satellite a few fractions of a second before it receives the signal from the second satellite, it can deduce that the first satellite is closer than the second satellite, and further use the time delay value and the known location of each satellite to determine its own position (although technically at least three satellites are required to determine a latitude and longitude, this example is intended to be illustrative only).

However, using signals received from a GNSS system alone may not provide enough accuracy. Sometimes (especially in the past), the signals sent by satellites of a GNSS system are purposefully obfuscated to limit the accuracy available to certain users. For example, a military force may introduce inaccuracies to a system that only they can correct, providing the military force with location information more accurate than that available to the general public, or, more importantly, to an enemy force. Also, other delays, such as distortions of signals as they pass through the ionosphere, create other, unintentional inaccuracies.

To correct for the inaccuracies, a GNSS augmentation system may be provided. Returning now to FIG. 5, an augmentation system 90, typically consisting of one or more permanent, fixed beacons or towers, is used to transmit an error correction signal 80 to the location sensor 95 located within the planter 10. The concept behind most augmentation systems 90 is as follows: One or more augmentation system transmitters 90 are mounted in fixed, permanent locations with precisely determined geographical locations. The augmentation system transmitter 90 receives the same information signals 70 from the satellites 60 and uses this information 70 to calculate its location. The augmentation system transmitter 90 then compares this calculated location to its own precisely-known location, and uses the difference between the two to determine the amount of error present in the information 70 received from the satellites 60. The augmentation system transmitter 90 then transmits this error information to the location sensor 95 on the planter 10 as an error correction signal 80. The location sensor 95 uses the error correction signal 80 to determine the errors in its own location calculation, and corrects the location information appropriately.

Some augmentation systems transmit corrections from orbiting satellites instead of ground-based transmitters, and these systems are generically referred to as satellite-based augmentation systems, or SBAS.

Examples of SBAS systems in use today include the Wide-Area Augmentation System (WAAS), European Geostationary Navigation Overlay Service (EGNOS), Multi-functional Satellite Augmentation System (MSAS), and GPS-Aided Geo Augmented Navigation (GAGAN), as well as the commercial systems StarFire and OmniSTAR.

Other augmentation systems are based on networks of ground-based reference stations, instead of satellite-based references. These augmentation systems are generically referred to as differential location systems (such as differential GPS, or DGPS, a term used to describe the augmentation of the United States' Global Positioning System using ground-based transmitters).

A specific type of augmentation system that is in increasing use is the real-time kinematic, or RTK, radio system. The RTK system uses a single base station with a known location. The base station receives signals from the GNSS satellites 60, but uses the carrier wave of the information signal 70 instead of the content within the signal 70 to determine a more accurate error correction value.

The goal of an augmentation system is to increase the accuracy of the location information calculated by a system such that the location is accurate to within a few centimeters. This is possible with several of the described augmentation systems, and new methods and systems for creating highly accurate location information are continually being developed and introduced. The intent of the invention described herein is that is be designed such that it can take advantage of the most accurate location information source available, including the available augmentation systems in a region.

For now, it is sufficient to state that the location sensor 95 shall be capable of receiving some type of error correction or augmentation signal such that it can generate a location with sufficient accuracy for the planter 10 to perform its functions as described herein.

It should be noted that alternate embodiments of the planter 10 can exist which generate location information by different means without varying from the intent of the invention as described herein. For example, the Global Positioning System (GPS) mentioned as an example above is but one of several satellite-based systems that can be used for navigation. The GPS system is used widely in the United States today, but is not the only such system. Examples of other similar GNSS systems, either already in use today or planned to be, are GLONASS, GALILEO, Compass, and the Quasi-Zenith Satellite System (QZSS). As these and other future GNSS systems come into use, and offer additional capabilities, it may be that the planter 10 will not require a separate augmentation signal. Also, it should be noted that some areas may offer a non-satellite based system for location determination, such as a system which triangulates position from cellular towers or other existing ground-based systems.

With the highly-accurate location sensor, the planter 10 will know its own position relative to the location data of the virtual tramlines 232. The planter 10 can also determine the precise location of each of the seeding units it has, as these units will be in a known configuration for each planter type (for instance, Seeding Unit 1 is 2.5 meters back and 3.2 meters to the starboard side of the vehicle, in relation to the location sensor). By knowing the precise location of each of its seeding units, as well as the precise (desired) location of each tramline, the planter can selectively turn off a seeding unit when it detects that the unit is over one of the virtual tramlines. The planter no longer has to keep track of which pass it is on (required by the methods in the prior art) and does not need to know the width of any subsequent vehicle. It only needs to have the tramline definition file for the current field. It can move through the field in any direction (not required to be parallel to the tramlines anymore), and no data entry is required by the planter operator (assuming the tramline file is automatically downloaded to the planter 10 prior to working on the field).

Figure 6B:
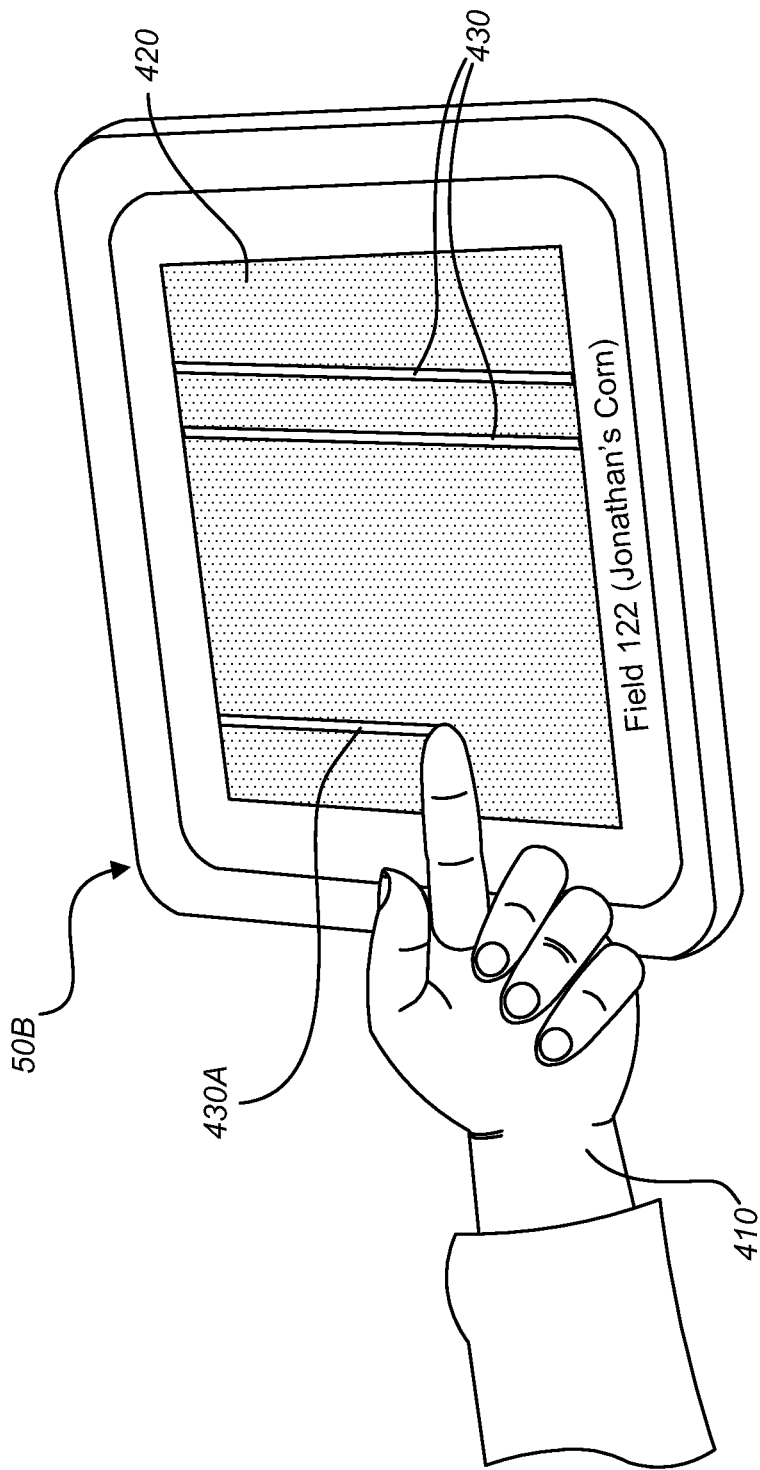
FIG. 6B is an illustration of how an operator can use a mobile device to define the desired locations for tramlines in a field.

In order for the present invention to work, the data defining the virtual tramlines 232 must first be created or defined and then downloaded into the planter control system 55. The act of defining the virtual tramlines 232 will take place on a computer terminal 50, as shown in FIG. 4. FIGS. 6A and 6B show two variations on the computer terminal 50. In FIG. 6A, a display 50A that is either a monitor for a desktop computer, a display on a laptop computer, or a vehicle-mounted display is used to display a graphical representation of a field or area of land 420. An operator 410 will interact with the computer terminal 50A to create graphical representations of tramlines 430 on the field representation 420. This might be done with a touch screen, as shown in FIG. 6A, whereby the operator 410 uses a finger to create a new tramline 430A on the field representation 420. This could alternately be done with a mouse or other pointing device, or by entering coordinate data on a keyboard. Also, the tramline representations 430 might be automatically generated based on the known width and configuration of the subsequent vehicle 20 and the known dimensions of the field 420.

FIG. 6B is almost identical to FIG. 6A, but replaces the computer terminal 50A with a mobile device 50B. The intended functionality of the computer terminal 50 (either 50A, 50B, or some other appropriate embodiment) is the same in any case. The computer terminal 50 is used to create virtual tramlines 232 which can be downloaded to the planter control system 55 for the creation of agricultural timelines.

Figure 7:
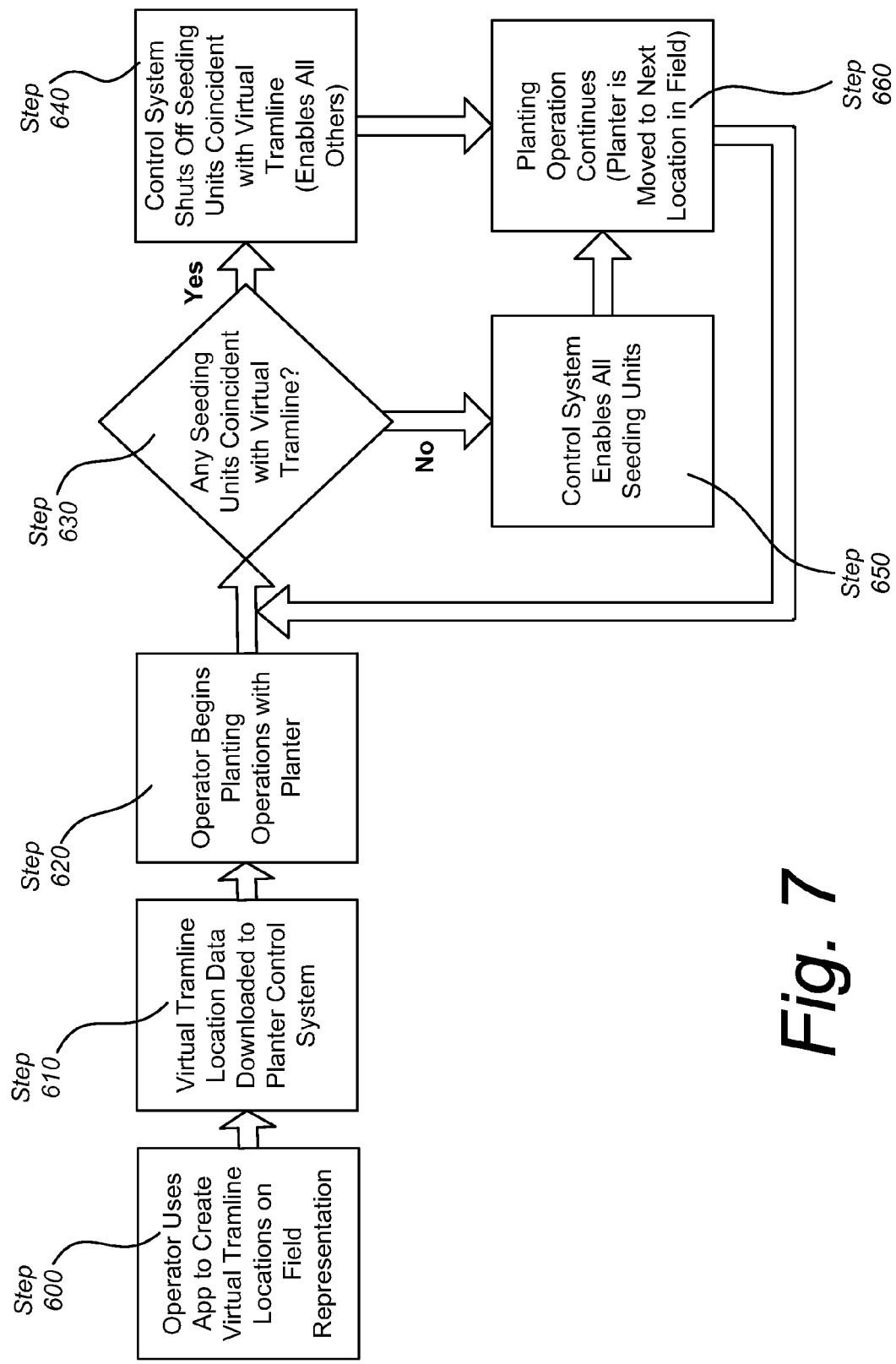
FIG. 7 is a flowchart detailing one embodiment of the system and method for creating agricultural tramlines of the present invention.

Finally, we turn to FIG. 7, which shows a flowchart detailing one embodiment of the system for the creation of agricultural tramlines of the present invention. In Step 600, the operator uses an application or program running on the computer terminal (component 50 of FIG. 4, 50A of FIG. 6A, or 50B of FIG. 6B) to define virtual tramlines on a graphic representation of a field or plot of land. This "virtual tramline location data" is then downloaded to the planter control system (Step 610) and the operator begins planting operations (Step 620).

Once planting operations are underway (Step 620), the planter control system 55 determines if any seeding units 240 are coincident (that is, in the same location as) any part of the virtual tramline 232 (Step 630). If one or more seeding units 240 is indeed coincident with a part of the virtual tramline 232, then the planter control system 55 will turn those seeding units 240 off until they are no longer coincident with the virtual tramline 232 (Step 640). Otherwise, any seeding units 240 that are not coincident with the virtual tramline 232 are enabled and allowed to seed (Step 640, Step 650). The planting operation continues, and the planter moves forward to continue seeding (Step 660). This process is repeated (Steps 630 to 660) as long as planting operations are underway.

Having described the preferred embodiment, it will become apparent that various modifications can be made without departing from the scope of the invention as defined in this document. In particular, an alternate embodiment of the present invention that does not depend on a highly accurate location sensor can be used. In this alternate version of the invention, the application running on the computer terminal will show a graphic representing the approximate dimensions of the field (but not dependent on location), and the farmer will be able to see the entire field covered in vertical "columns" with each column representing a path that at least one of the seeding units will pass over during a complete seeding operation for that field. (That is, the graphic will look as if there are enough seeding units on the planter to cover the entire width of the field, even if a given planter only has six actual seeding units, for example). The farmer will use the application to mark off which of the potential seeding unit paths across the field will be tramline locations (the app may aid the farmer by suggesting tramline locations based on sprayer widths or other data). For example, a field graphic may show 100 potential seeding unit paths across the field graphic, and the farmer might indicate that paths 20 and 24, 40 and 44, 60 and 64, and 80 and 84 will represent tramline locations. This act of selecting which columns should be tramlines might also be done automatically by the application (and not by the planter itself), by knowing the dimensions and configurations of the subsequent vehicle that is to be used on the field following the planter. It should be noted that the prior art systems require that the planter itself actually know the dimensions (width) of the subsequent vehicle in order to determine which seeding units should be disabled or enabled. The use of an off-board computer (such as a desktop computer or a mobile device) running an application to determine the location of the desired tramlines divorces the planter from having any knowledge of the subsequent vehicle. All the planter ever sees is a definition of and a desired location for a "virtual tramline," and it has no knowledge of the dimensions of the subsequent vehicle. This is an important distinction, as a single planter need not ever be dependent on one type of subsequent vehicle, and so it can easily work with multiple types of subsequent vehicles simply by downloading a new virtual tramline file.

Now, when the virtual tramline file is downloaded to the planter, the planter does not rely on location data to shut seeding units off, but keeps track of the paths it "consumes" as it makes successive passes through the field, and knows that when it reaches path 20 (for example), it should figure out which seeding unit represents that path and disable it for that path. The location data is not needed, as the planter simply keeps track of the number of passes it makes to determine when it gets to the virtual tramline location.

This alternate embodiment does not stray from the inventive concept captured herein; an operator creates a definition of virtual tramline locations (by any of the methods described in this specification, or other appropriate methods), downloads that file to the planter's control system, and the planter's control system uses that information to disable individual seeding units to create the actual agricultural tramlines.

What is claimed:
1. A system for creating an agricultural tramline, comprising
    an agricultural planting machine;
    a computer terminal;
    an application executing on the computer terminal;

a plurality of seeding units mounted on the agricultural planting machine;

a location sensor mounted on the agricultural planting machine;

a control system mounted on the agricultural planting machine; and whereby an operator can use the application to create a file specifying the location of a desired agricultural tramline on a plot of land, the file is downloaded from the computer terminal to the control system, the control system calculates a unit location for each of the plurality of seeding units based on the location sensor and independent of a dimension of the agricultural planting machine, and the control system uses the location of the desired agricultural tramline and unit location information to enable and disable the plurality of seeding units when they are coincident with the location of the desired agricultural tramline, such that the area of land corresponding to the desired agricultural tramline is not planted with seed.

2. The system for creating an agricultural tramline of claim 1, where the computer terminal is a desktop computer.

3. The system for creating an agricultural tramline of claim 1, where the computer terminal is a mobile device.

4. The system for creating an agricultural tramline of claim 1, where the computer terminal is a display that is mounted in the cab of the vehicle.

5. The system for creating an agricultural tramline of claim 1, where the location sensor is a GNSS receiver.

6. The system for creating an agricultural tramline of claim 5, where the GNSS receiver is capable of receiving an augmentation signal, whereby the augmentation signal allows the GNSS receiver to calculate a more accurate geospatial location than is possible without the augmentation signal.

7. A system for creating an agricultural tramline, comprising an agricultural planting machine;

a computer terminal;

an application executing on the computer terminal;

a plurality of seeding units mounted on the agricultural planting machine;

a control system mounted on the agricultural planting machine; and whereby an operator can use the application to create a file specifying the location of a desired agricultural tramline on a plot of land in relation to a boundary of the plot of land, the file is downloaded from the computer terminal to the control system, the control system calculates a precise unit location for each of the plurality of seeding units based on the location sensor and independent of a dimension of the agricultural planting machine, and the control system uses the relative location of the desired agricultural tramline and unit location information to enable and disable the plurality of seeding units when they are coincident with the location of the desired agricultural tramline, such that the area of land corresponding to the desired agricultural tramline is not planted with seed.

8. The system for creating an agricultural tramline of claim 7, where the computer terminal is a desktop computer.

9. The system for creating an agricultural tramline of claim 7, where the computer terminal is a mobile device.

10. The system for creating an agricultural tramline of claim 7, where the computer terminal is a display that is mounted in the cab of the vehicle.

11. A method for creating an agricultural tramline, comprising the steps of creating a tramline definition file defining the desired geographic location of one or more agricultural tramlines within a plot of land;

equipping an agricultural planting machine with a control system which can enable and disable the planting function of each of a series of individual seeding units mounted on the agricultural planting machine;

equipping the agricultural planting machine with a location sensor;

transferring the tramline definition file to the control system;

commanding the control system to obtain the current geographic location of the agricultural planting machine;

commanding the control system to calculate the geographic locations of each of the series of individual seeding units based on the current geographic location of the agricultural planting machine;

commanding the control system to compare the geographic locations of each of the series of individual seeding units to the desired geographic location of the one or more agricultural tramlines defined by the file;

commanding the control system to disable any individual seeding unit that is coincident with the desired geographic location of the one or more agricultural tramlines, and enable the remaining individual seeding units;

wherein the step of commanding the control system to disable any individual seeding unit is done independent of a dimension of the agricultural planting machine; and whereby an area in the plot of land that is coincident with the desired geographic location of the one or more agricultural tramlines is not seeded, while the remaining area of the plot of land is seeded, such that an agricultural tramline is created.

12. A method for creating an agricultural tramline, comprising the steps of creating a tramline definition file defining the desired location of one or more agricultural tramlines within a plot of land and the shape and dimensions of the plot of land, wherein the desired location of the one or more agricultural tramlines is expressed as a relative offset from a boundary of the plot of land;

equipping an agricultural planting machine with a control system which can enable and disable the planting function of each of a series of individual seeding units mounted on the agricultural planting machine;

transferring the tramline definition file to the control system;

commanding the control system to track the number of passes the agricultural planting machine makes through the plot of land relative to the boundary of the plot of land;

commanding the control system to compare the desired location of the one or more agricultural tramlines defined by the file with the number of passes;

commanding the control system to disable any individual seeding unit that is coincident with the desired location of the one or more agricultural tramlines based on the comparison of desired tramline locations and the number of passes, and enable the remaining individual seeding units;

wherein the step of commanding the control system to disable any individual seeding unit is done independent of a dimension of the agricultural planting machine; and whereby an area in the plot of land that is coincident with the desired location of the one or more agricultural tramlines is not seeded, while the remaining area of the plot of land is seeded, such that an agricultural tramline is created.

* * * * *